United States Patent Office 3,483,083
Patented Dec. 9, 1969

3,483,083
MANUFACTURE OF ACIDS AND ESTERS
George Wynne Elson, Ralph Howe, and Derrick Fleet Jones, Macclesfield, England, assignors to Imperial Chemical Industries Limited, London, England, a corporation of Great Britain
No Drawing. Filed Oct. 17, 1966, Ser. No. 586,946
Claims priority, application Great Britain, Nov. 3, 1965 46,603/65
Int. Cl. C12b *1/00;* C12d *1/02*
U.S. Cl. 195—30        8 Claims

ABSTRACT OF THE DISCLOSURE

α,ω-alkylenedioic acids and esters thereof are prepared by fermenting a compound of the formula $CH_3.B.R^2$ wherein $R^2$ stands for an ester group, and B stands for either a group of the formula —$(CH_2)_y$—, wherein $y$ stands for an integer from 15 to 25, or B stands for an unsaturated straight-chain aliphatic group containing 15 to 25 carbon atoms with certain strains of Torulopsis. Typically the compound to be converted is n-hexadecyl bromide and the ester produced is dimethyl 1, 16-hexadecandioate. The corresponding dicarboxylic acid may be produced by hydrolysis of the di-ester.

---

This invention relates to the manufacture of acids and esters, and more particularly it relates to a process for the manufacture of α,ω-alkylenedioic acids and the esters thereof.

According to the invention we provide a process for the manufacture of compounds of the formula:

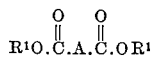

wherein $R^1$ stands for hydrogen, or an alkyl or aryl radical of not more than 10 carbon atoms, and A stands for a group of the formula —$(CH_2)_x$—, optionally substituted, wherein $x$ stands for an integer from 14 to 16, or A stands for an unsaturated straight-chain aliphatic group containing 14 to 16 carbon atoms, optionally substituted, which comprises the fermentation of a compound, or a mixture of compounds, of the formula $CH_3.B.R^2$, wherein $R^2$ stands for an ester group, and B stands for a group of the formula —$(CH_2)_y$—, optionally substituted, wherein $y$ stands for an integer from 15 to 25, or B stands for an unsaturated straight-chain aliphatic group containing 15 to 25 carbon atoms, optionally substituted, in the presence of an active microorganism as defined hereinafter.

The product of the fermentation may be reacted with a compound of the formula $R^3.OH$, wherein $R^3$ stands for an alkyl or aryl radical of not more than 10 carbon atoms, under acidic or alkaline conditions, whereafter, if desired, the di-ester thereby obtained is converted into the corresponding dicarboxylic acid by hydrolysis. Alternatively, the product of the fermentation may be hydrolysed under acidic or alkaline conditions to give the dicarboxylic acid directly.

When $R^1$ or $R^3$ stands for an alkyl radical it may, for example, stand for an alkyl radical of not more than 8 carbon atoms, for example the methyl, ethyl or n-hexyl radical. As a suitable value for $R^1$ or $R^3$ when it stands for an aryl radical there may be mentioned, for example, the phenyl radical.

As a suitable value for $R^2$ there may be mentioned, for example, an ester group derived from an inorganic acid, for example $R^2$ may stand for a chlorine, bromine or iodine atom, or $R^2$ may stand for an ester group derived from an organic acid, for example a group of the formula —$O.SO_2.R^4$ wherein $R^4$ stands for an aryl radical of not more than 10 carbon atoms, for example the phenyl radical, optionally substituted with, for example, an alkyl radical of not more than 3 carbon atoms, for example the methyl radical. As a suitable substituent which may optionally be present in the radical represented by A or B there may be mentioned, for example, an alkyl radical of not more than 3 carbon atoms, for example the methyl radical. As a suitable value for A or B when it stands for an unsaturated group there may be mentioned an ethylenically unsaturated radical.

It is to be understood that the expression "active microorganism" used herein means Torulopsis strain NCYC 675 [which has ben deposited under this number, and typed as a strain of *Torulopsis gropengiesseri,* in the National Collection of Yeast Cultures (Brewing Industry Research Foundation, Nutfield, Redhill, Surrey, England)] and other microorganisms which can replace the said microorganism NCYC 675 in the fermentation process described in Example 1 hereinafter and afford essentially the same results. Other active microorganisms are the Torulopsis strains NCYC 689 and NCYC 690 (which have likewise been deposited in the National Collection of Yeast Cultures).

The compound(s) of the formula $CH_3.B.R^2$, wherein B and $R^2$ have the meanings stated above, may be added to the culture medium in a single portion or in several portions at intervals. Up to 2% w./v., for example 0.2 to 0.6% w./v., of said compound(s) per culture medium may conveniently be added at any one time.

The fermentation may be carried out in an aqueous medium containing a carbon source, for example glucose at 5–20% w./v., a nitrogen source, for example urea at 0.05–0.5% w./v. and/or yeast extract at 0.1–1.5% w./v., a magnesium source, for example magnesium sulphate heptahydrate at 0.05–0.7% w./v., a sulphur source, for example the sulphate referred to above, a phosphorus source, for example potassium dihydrogen phosphate at 0.001–0.5% w./v., and a potassium source, for example the phosphate referred to above, and traces of salts containing metals, for example salts of iron, for example ferrous sulphate heptahydrate (up to 10 p.p.m.), copper, for example copper sulphate pentahydrate (up to 5 p.p.m.), zinc, for example zinc sulphate heptahydrate (up to 10 p.p.m.), manganese, for example manganese sulphate tetrahydrate (up to 5 p.p.m.), and molybdenum, for example potassium molybdate (up to 5 p.p.m.). The fermentation may conveniently be carried out at a temperature between 18° and 32° C.

The product of the fermentation may, as indicated above, be hydrolysed directly to the appropriate dicarboxylic acid under acidic conditions, for example by the use of acetic acid, or under alkaline conditions, for example by the use of an alkali metal hydroxide, for example sodium hydroxide. The hydrolysis is carried out in the presence of water, and an organic solvent, for example methanol, may also be present.

Suitable acidic conditions for use in the interaction involving the compound of the formula $R^3.OH$, wherein $R^3$ has the meaning stated above, are provided, for example, by the use of an inorganic acid, for example sulphuric acid or hydrochloric acid, or an organic acid, for example p-toluenesulphonic acid. This interaction may conveniently be accelerated or completed by the application of heat. Suitable alkaline conditions for use in the interaction involving the compound of the formula $R^3.OH$, wherein $R^3$ has the meaning stated above, are provided, for example, by the use of a compound of the formula $R^3.OM$, wherein $R^3$ has the meaning stated above and M stands for an alkali metal, for example sodium.

The dicarboxylic acids may alternatively be obtained from the corresponding di-esters by hydrolysis with an alkali metal hydroxide, for example sodium or potassium hydroxide, in the presence of water and optionally in the presence of an organic diluent or solvent, for example methanol.

In those cases of the process of the invention where the main chain of B contains 15 or 16 carbon atoms, said process involves no loss of carbon atoms from said main chain and therefore, for example, fermentation of n-hexadecyl bromide [B standing for $(CH_2)_{15}$] affords 1,16-hexadecandioic acid and derivatives thereof [A standing for $(CH_2)_{14}$; it will be appreciated that the methylene radical immediately adjacent to the $R^2$ group becomes one of the two carboxy groups, or derivatives thereof, in the product]. On the other hand, in those cases where the said main chain of B contains 18 to 25 carbon atoms, said process involves the loss of pairs of carbon atoms from said main chain, and the product predominantly obtained is that wherein the main chain of A contains 14 or 15 carbon atoms, depending on whether, in the starting material, the main chain of B contains an odd or even number of carbon atoms, respectively. Thus, for example, fermentation of n-docosyl bromide (wherein B contains 21 carbon atoms), followed by interaction of the product with methanol and sulphuric acid, affords dimethyl 1,16-hexadecandioate (wherein A contains 14 carbon atoms) and a small amount of dimethyl 1,18-octadecandioate (wherein A contains 16 carbon atoms). Starting materials wherein the main chain of B contains 17 carbon atoms, for example n-octadecyl bromide, constitute a borderline case in which, besides the directly corresponding product there is obtained the product formed by a process involving the loss of one pair of carbon atoms from said main chain. Thus, for example, fermentation of n-octadecyl bromide followed by interaction of the product with methanol and sulphuric acid affords a mixture of dimethyl 1,16-hexadecandioate and dimethyl 1,18-octadecandioate.

As specific products of the process of the invention there may be mentioned, for example, dimethyl 1,16-hexadecandioate, dimethyl 1,17-heptadecandioate, dimethyl 1,18-octadecandioate, dimethyl hexadec-7-en-1,6-dioate, dimethyl octadec-9-en-1,18-dioate, dimethyl 2-methyl-1,16-hexadecandioate, diethyl 1,16-hexadecandioate, di-n-hexyl 1,16-hexadecandioate, diphenyl 1,16-hexadecandioate, 1,16-hexadecandioic acid and 2-methyl-1,16-hexadecandioic acid.

The esters and acids manufactured according to this invention are useful as intermediates, for example they are useful in the manufacture of synthetic lubricants, plasticisers, thermoplastic resins, adhesives, elastomers, antioxidants, synthetic fibres, and perfumes. In particular, the dialkyl esters, for example dimethyl 1,16-hexadecandioate, can be converted by conventional means into the corresponding diamides and thence into the corresponding diamines, for example hexadecan-1,16-diamine, and the said diamines can be reacted with terephthalic acid to form salts which can be polymerised by conventional means to form fibre-forming polymers.

The invention is illustrated but not limited by the following examples in which the parts are by weight unless otherwise stated. Gas chromatography was used to determine the composition of the crude reaction mixtures, to monitor the purification of the products, and to identify the products by comparison with standard samples. A silicone rubber gum column was used at an operating temperature of 200° C.

EXAMPLE 1

A nutrient solution having the following composition is prepared by dissolving the constituents in distilled water.

Per litre of distilled water:

| | | |
|---|---|---|
| Glucose | g | 100 |
| Yeast extract | g | 5.0 |
| Urea | g | 1.0 |
| $KH_2PO_4$ | g | 1.0 |
| $MgSO_4.7H_2O$ | g | 3.0 |
| $FeSO_4.7H_2O$ | mg | 1.0 |
| $CuSO_4.5H_2O$ | mg | 0.15 |
| $ZnSO_4.7H_2O$ | mg | 1.0 |
| $MnSO_4.4H_2O$ | mg | 0.1 |
| $K_2MoO_4$ | mg | 0.1 |

The resulting solution is adjusted to pH 6.5 by the addition of 3.3 ml. of 1 N-sodium hydroxide solution.

1500 parts of the nutrient solution are sterilized by heating in an autoclave at 120° C. for 20 minutes. The sterile nutrient solution is cooled, and is then inoculated with a distilled water suspension of cells prepared from a stock agar culture of the above-mentioned strain No. NCYC 675 of Torulopsis. The mixture is incubated at 25° C. on a rotary shaker. At or near the completion of the logarithmic growth phase, that is to say from 24 to 36 hours after inoculation, there is added an aqueous emulsion of n-hexadecyl bromide [prepared by stirring 15 parts of n-hexadecyl bromide together with 15 parts of a 3% w./w. aqueous solution of starch, 0.3 part of "Tween" 80 ("Tween 55 is a trademark) and 0.03 part of "Span" 80 ("Span" is a trademark)]. Incubation is continued for 5 days after the addition of n-hexadecyl bromide. The mixture is culture fluid and cells is extracted with 1500 parts of ethyl acetate in three equal portions. The ethyl acetate extract is dried, and then the ethyl acetate is evaporated. The residual gum is stirred together with 5 parts of ethyl acetate, and 100 parts of light petroleum (B.P. 40–60° C.) are added to the resulting solution. When the separation of gummy solid is complete, the supernatant liquid is decanted. The gummy solid is dissolved in 250 parts of a 5% w./w. solution of sulphuric acid in methanol, and the solution is kept at 25° C. for 4 hours and then heated under reflux for 5 hours. The methanol is evaporated under reduced pressure. The residual gum is shaken together with 150 parts of ether and 50 parts of water. The ether layer is washed with 10% w./v. sodium carbonate, and then with water, and is then dried. The ether is evaporated and the solid residue is crystallized from methanol. There is thus obtained dimethyl 1,16-hexadecandioate, M.P. 50–51° C.

0.1 part of dimethyl 1,16-hexadecandioate is heated under reflux with a solution of 0.5 part of potassium hydroxide in 5 parts of methanol for 4 hours. The methanol is evaporated and the residue is shaken together with 5 parts of 2 N-hydrochloric acid and 40 parts of ether. The ethereal layer is separated from the mixture, dried, and the solvent is evaporated. The residue is crystallised from acetone and there is thus obtained 1,16-hexadecandioic acid, M.P. 123–124° C.

Stock cultures of strain No. NCYC 675 of Torulopsis are grown at 25° C. on a medium containing 300 parts of honey, 5 parts of yeast extract, 22 parts of agar ,and 1000 parts of distilled water. Master cultures of strain No. NCYC 675 of Torulopsis are grown at 25° C. on a medium containing 300 parts of honey, 5 parts of yeast extract, and 1000 parts of distilled water, and are then maintained at 4° C.

EXAMPLE 2

The process of Example 1 is repeated except that an aqueous suspension of technical n-octadecyl bromide (containing 15% of n-hexadecyl bromide) is used in place of the aqueous emulsion of n-hexadecyl bromide. The aqueous suspension is prepared by stirring 15 parts of technical n-octadecyl bromide together with 15 parts of a 3% aqueous solution of starch, 0.03 part of "Tween" 80 ("Tween" is a trademark) and 0.03 part of "Span" 80 ("Span" is a trademark) at 30° C. There is thus obtained a mixture of dimethyl 1,16-hexadecandioate and dimethyl 1,18-octadecandioate, M.P. 42° C.

EXAMPLE 3

The process of Example 1 is repeated except that an aqueous suspension of n-octadecyl bromide is used in place of the aqueous emulsion of n-hexadecyl bromide. The aqueous suspension is prepared by stirring 15 parts of n-octadecyl bromide together with 15 parts of a 3% aqueous solution of starch, 0.03 part of "Tween" is a trademark) and 0.03 part of "Span" 80 ("Span" is a trademark) at 30° C. There is thus obtained a mixture of dimethyl 1,16-hexadecandioate and dimethyl 1,18-octadecandioate, M.P. 45° C.

EXAMPLE 4

The procedure of Example 1 is repeated except that 15 parts of n-hexadecyl bromide are replaced by 15 parts of n-heptadecyl bromide. There is thus obtained dimethyl 1,17-heptadecandioate, M.P. 51° C.

EXAMPLE 5

The procedure of Example 1 is repeated except that 15 parts of n-hexadecyl bromide are replaced by 15 parts of n-hexadecyl chloride. There is thus obtained dimethyl 1,16-hexadecandioate, M.P. 50–51° C.

EXAMPLE 6

The procedure of Example 1 is repeated except that 15 parts of n-hexadecyl bromide are replaced by 15 parts of n-octadecyl chloride. There is thus obtained a mixture of dimethyl 1,16-hexadecandioate and dimethyl 1,18-octadecandioate, M.P. 54° C.

EXAMPLE 7

The procedure of Example 1 is repeated except that 15 parts of n-hexadecyl bromide are replaced by 15 parts of n-docosyl bromide. There is thus obtained substantially pure dimethyl 1,16-hexadecandioate which contains a small amount of dimethyl 1,18-octadecandioate, the mixture having M.P. 48–49° C.

EXAMPLE 8

The procedure of Example 1 is repeated except that 15 parts of n-hexadecyl bromide are replaced by 15 parts of n-eicosyl bromide. There is thus obtained substantially pure dimethyl 1,16-hexadecandioate which contains a small amount of dimethyl 1,18-octadecandioate, the mixture having M.P. 47–48° C.

EXAMPLE 9

The procedure of Example 1 is repeated as far as the isolation of the gummy solid except that 15 parts of n-hexadecyl bromide are replaced by 15 parts of n-octadec-9-enyl bromide. 1 part of the gummy solid is dissolved in 2.5 parts of a 5% w./w. solution of sulphuric acid in methanol, and the solution is then heated under reflux for 6 hours. The methanol is evaporated under reduced pressure. The residual gum is shaken together with 10 parts of ether and 5 parts of water. The ether layer is washed with 10% w./v. sodium carbonate solution, and then with water, and is then dried. The ether is evaporated and the residual oil, dissolved in 1 part of light petroleum (B.P. 60–80° C.), is chromatographed on a column of 20 parts of alumina (neutral; Grade IV) using light petroleum (B.P. 60–80° C.) as initial solvent. The material eluted by 40 parts of light petroleum (B.P. 60–80° C.) is discarded. The material eluted by the next 50 parts of light petroleum (B.P. 60–80° C.) and by 10 parts of 5% acetone in light petroleum (B.P. 60–80° C.) consists of a mixture of dimethyl octadec-9-en-1,18-dioate and dimethyl hexadec-7-en-1,16-dioate.

EXAMPLE 10

The procedure of Example 1 is repeated as far as the isolation of the gummy solid. 1 part of the gummy solid is dissolved in 2.5 parts of a 5% w./w. solution of sulphuric acid in ethanol, and the solution is then heated under reflux for 6 hours. The ethanol is evaporated under reduced pressure. The residual gum is shaken together with 10 parts of ether and 5 parts of water. The ether layer is washed with 10% w./v. sodium carbonate solution, and then with water, and is then dried. The ether is evaporated and the solid residue is crystallised from methanol. There is thus obtained diethyl 1,16-hexadecandioate, M.P. 38° C.

EXAMPLE 11

The procedure of Example 1 is repeated as far as the isolation of the gummy solid. 1 part of the gummy solid and 0.75 part of p-toluenesulphonic acid are dissolved in 15 parts of methanol, and the solution is heated under reflux for 6 hours. The methanol is evaporated under reduced pressure. The residual gum is shaken together with 10 parts of ether and 5 parts of water. The ether layer is washed with 10% w./v. sodium carbonate solution, and then with water, and is then dried. The ether is evaporated and the solid residue is crystallised from methanol. There is thus obtained dimethyl 1,16-hexadecandioate, M.P. 49–50° C.

EXAMPLE 12

The procedure of Example 1 is repeated as far as the isolation of the gummy solid. 3.8 parts of the gummy solid are heated with a solution of 0.5 part of sodium in 60 parts of phenol at 100° C. for 14 hours. The mixture is cooled, dissolved in 200 parts of ether, and the solution is then shaken successively three times with 50 parts of 3 N-sodium hydroxide solution, six times with 50 parts of 1 N-sodium hydroxide solution and then four times with 50 parts of water. The ether solution is dried, the ether is evaporated, and the residual solid is crystallised from light petroleum (B.P. 60–80° C.). There is thus obtained diphenyl 1,16-hexadecandioate, M.P. 86–87° C.

EXAMPLE 13

The procedure of Example 1 is repeated as far as the isolation of the gummy solid. 2.5 parts of the gummy solid and 15 parts of a 5% w./w. solution of sulphuric acid in n-hexanol are heated under reflux for six hours. The n-hexanol is evaporated under reduced pressure. The residual gum is shaken together with 10 parts of ether and 5 parts of water. The ether layer is washed with 10% w./v. sodium carbonate solution, then with water, and is then dried. The ether is evaporated and the residual oil, dissolved in 3 parts of light petroleum (B.P. 60–80° C.), is chromatographed on a column of 30 parts of alumina (neutral; Grade III) using light petroleum (B.P. 60–80° C.) as solvent. The material eluted with light petroleum solidifies when cooled to 0° C. The solid material is crystallised from methanol at low temperature and there is thus obtained di-n-hexyl 1,16-hexadecandioate, M.P. 29° C.

EXAMPLE 14

The procedure of Example 1 is repeated as far as the isolation of the gummy solid. 1 part of the gummy solid, 0.1 part of glacial acetic acid and 2 parts of methanol are heated under reflux for 6 hours, and then the methanol is evaporated under reduced pressure. The residual gum is shaken together with 10 parts of ether and 10 parts of N-soduim hydroxide solution. 2 parts of 6 N-hydrochloric acid are added to the aqueous solution and the mixture is extracted with 30 parts of ether. The ether solution is washed with water, dried, and then the ether is evaporated. The residual solid is crystallised from acetone. There is thus obtained 1,16-hexadecandioic acid, M.P. 122–123° C.

EXAMPLE 15

The procedure of Example 1 is repeated as far as the isolation of the gummy solid. 5.5 parts of the gummy solid and a solution of 0.1 part of sodium in 55 parts of methanol are heated under reflux for 24 hours and then the methanol is evaporated under reduced pressure. The residual solid is repeatedly extracted with dry ether. The ether extracts are combined and then evaporated. The residual solid is crystallised from methanol and there is thus obtained dimethyl 1,16-hexadecandioate, M.P. 49–50° C.

EXAMPLE 16

The procedure of Example 1 is repeated except that 15 parts of n-hexadecyl bromide are replaced by 15 parts of n-hexadecyl iodide. There is thus obtained dimethyl 1,16-hexadecandioate, M.P. 50° C.

EXAMPLE 17

The procedure of Example 1 is repeated except that 15 parts of n-hexadecyl bromide are replaced by 15 parts of n-octadecyl iodide. There is thus obtained a mixture of dimethyl 1,16-hexadecandioate and dimethyl 1,18-octadecandioate, M.P. 45° C.

EXAMPLE 18

The procedure of Example 1 is repeated as far as the isolation of the gummy solid except that 15 parts of n-hexadecyl bromide are replaced by 15 parts of 2-methyl-n-hexadecyl bromide. The gummy solid is heated under reflux with 250 parts of a 5% w./w. solution of sulphuric acid in methanol for 5 hours and then the methanol is evaporated under reduced pressure. The residual gum is shaken together with 150 parts of ether and 50 parts of water. The ether layer is washed with 10% w./v. sodium carbonate solution, then with water, and is then dried. The ether is evaporated and the residual oil, dissolved in 5 parts of light petroleum (B.P. 60–80° C.), is chromatographed on a column of 27 aprts of alumina (neutral, Grade III) using light petroleum (B.P. 60–80° C.) as initial solvent. The material eluted by 0.25% v./v. acetone in light petroleum (B.P. 60–80° C.) consists of dimethyl 2-methyl-1,16-hexadecondioate.

0.1 part of dimethyl 2-methyl-1,16-hexadecandioate is heated under reflux with a solution of 0.5 part of potassium hydroxide in 5 parts of methanol for 4 hours. The methanol is evaporated and the residue is shaken together with 5 parts of 2 N-hydrochloric acid and 40 parts of ether. The ethereal layer is separated from the mixture, dried and then the ether is evaporated. The residue is crystallised from acetone and there is thus obtained 2-methyl-1,16-hexadecandioic acid, M.P. 85° C.

The 2-methyl-n-hexadecyl bromide used in the above preparation may be obtained as follows:

12 parts of phosphorous tribromide are added during 30 minutes to a stirred solution of 7.5 parts of 2-methyl-n-hexadecanol in 30 parts of pyridine at 0° C. The mixture is kept at ambient temperature for 16 hours and is then heated at 100° C. for 1 hour. The mixture is cooled and sufficient ice is added to decompose the excess of phosphorus tribromide. The mixture is then extracted with 100 parts of ether in 2 portions. The combined ether extracts are washed with water, dried with anhydrous magnesium sulphate, and then evaporated to dryness. The residual oil is dissolved in 10 parts of light petroleum (B.P. 40–60° C.) and chromatographed on a column of 80 parts of silica using light petroleum (B.P. 40–60° C.) as solvent. The material eluted with light petroleum (B.P. 40–60° C.) is 2-methyl-n-hexadecyl bromide, B.P. 140° C./0.1 mm.

The 2-methyl-n-hexadecanol used in the above preparation may be obtained as follows:

1.2 parts of lithium aluminum hydride are added during 15 minutes to a stirred solution of 8.4 parts of methyl 2-methylpalmitate in 70 parts of ether. The mixture is heated under reflux with stirring for 45 minutes and then cooled. 10 parts of methanol are added and then 40 parts of 1 N-sulphuric acid. The mixture is shaken, the layers are separated and the aqueous layer is extracted three times with 50 parts of ether. The combined ether solutions are washed with water, dried with anhydrous magnesium sulphate and then the ether is evaporated. The residual oil is dissolved in 10 parts of light petroleum (B.P. 60–80° C.) and chromatographed on a column of 200 parts of silica using light petroleum (B.P. 60–80° C.) as solvent. The material eluted by light petroleum (B.P. 60–80° C.) and by 2% acetone in light petroleum (B.P. 60–80° C.) is crystallised from light petroleum (B.P. 60–80° C.), and there is thus obtained 2-methyl-n-hexadecanol, M.P. 36° C.

The methyl 2-methylpalmitate used in the above preparation may be obtained as follows:

10 parts of 2-methylpalmitic acid and 10 parts of 5% v./v. sulphuric acid in methanol are heated under reflux for 2 hours, and then the excess of methanol is evaporated. 50 parts of water are added to the residue and the mixture is extracted with 100 parts of ether in 3 portions. The combined ether extracts are washed with water, dried with anhydrous magnesium sulphate, and then the ether is evaporated. The residual oil is methyl 2-methylpalmitate.

EXAMPLE 19

The process of Example 1 is repeated as far as the isolation of the gummy solid except that 15 parts of n-hexadecyl bromide are replaced by 15 parts of n-hexadecyl p-toluenesulphonate. 1.1 parts of the gummy solid are heated under reflux with 25 parts of a 5% w./v. solution of sulphuric acid in methanol for 18 hours, and then the methanol is evaporated under reduced pressure. The residual gum is shaken together with 15 parts of ether and 5 parts of water. The ether layer is washed with 10% w./v. sodium carbonate solution, then with water, and is then dried. The ether is evaporated and the residual oil, dissolved in 1 part of light petroleum (B.P. 60–80° C.), is chromatographed on a column of 10 parts of alumina (neutral; Grade III) using light petroleum (B.P. 60–80° C.) as the initial solvent. The material eluted by 60 parts of light petroleum (B.P. 60–80° C.) is discarded. The material eluted by 100 parts of 0.5% v./v. acetone in light petroleum (B.P. 60–80° C.) is crystallised from methanol. There is thus obtained dimethyl 1,16-hexadecondioate, M.P. 48–49° C.

EXAMPLE 20

The procedure of Example 1 is repeated as far as the isolation of the gummy solid. 2 parts of the gummy solid and 32 parts of 5% w./v. sodium hydroxide in methanol are heated under reflux for 18 hours, and then the methanol is evaporated. 30 padts of 2 N-hydrochloric acid are added and the mixture is extracted with 100 parts of ether in 3 portions. The ether extracts are combined and shaken with 60 parts of 1 N-sodium hydroxide solution. The layers are separated and the aqueous alkaline layer is made acidic by the addition of concentrated hydrochloric acid. The mixture is extracted with 100 parts of ether in 3 portions. The extracts are combined, washed with water, dried over anhydrous magnesium sulphate, and then the ether is evaporated. The residual solid is crystallised from acetone and there is thus obtained 1,16-hexadecandioic acid, M.P. 125° C.

EXAMPLE 21

The process of Example 1 is repeated as far as the isolation of the gummy solid except that 15 parts of n-hexadecyl bromide are replaced by 15 parts of n-octadecyl p-toluenesulphonate. 1.1 parts of the gummy solid are heated under reflux with 80 parts of a 5% w./v. solution of sulphuric acid in methanol for 18 hours, and then the methanol is evaporated under reduced pressure. The residual gum is shaken together with 15 parts of ether and 5 parts of water. The ether layer is washed with 10% w./v. sodium carbonate, and then with water, and is then dried with anhydrous magnesium sulphate. The ether is evaporated and the residual oil, dissolved in 2 parts light petroleum (B.P. 60–80° C.), is chromatographed on a column of 10 parts of alumina (neutral; Grade III) using light petroleum (B.P. 60–80° C.) as the initial solvent. The material eluted by 120 parts of light petroleum (B.P. 60–80° C.) is discarded. The material eluted by 60 parts of 0.25% v./v. acetone in light petroleum (B.P. 60–80° C.) consists of a mixture of dimethyl 1,16-hexadecandioate and dimethyl 1,18-octadecandioate.

EXAMPLE 22

A nutrient solution having the following composition is prepared by dissolving the constituents in distilled water.
Per litre of distilled water:

| | | |
|---|---|---|
| Glucose | g | 100 |
| Yeast extract | g | 5.0 |
| Urea | g | 1.0 |
| $KH_2PO_4$ | g | 0.1 |
| $MgSO_4.7H_2O$ | g | 3.0 |
| $FeSO_4.7H_2O$ | mg | 1.0 |
| $CuSO_4.5H_2O$ | mg | 0.15 |
| $ZnSO_4.7H_2O$ | mg | 1.0 |
| $MnSO_4.4H_2O$ | mg | 0.1 |
| $K_2MoO_4$ | mg | 0.1 |

The resulting solution is adjusted to pH 6.0 by the addition of 0.4 ml. of 1 N-sodium hydroxide solution.

5 litres of the nutrient solution are transferred to a stirred fermentation apparatus. The fermentation apparatus has provision for the continuous injection of sterile air and is fitted with a 10.5 cm. diameter rotary paddle agitator. The agitator paddle consists of four blades set at 45° to give downward thrust and has a total thrust surface of 18 sq. cm. Agitation speed is 720 r.p.m. The apparatus and nutrient solution are sterilized by heating in an autoclave at 120° C. for 20 minutes. The apparatus and nutrient solution are cooled. Agitation is started and sterile air injected at a flow rate of 2.5 litres per minute. The fermentation temperature is controlled at 25° C. 4 g. of sterile polypropylene glycol are added to control foam formation. The inoculum is prepared by culturing Torulopsis gropengiesseri NCYC 675 on the above mentioned medium for 48 hours at 25° C. on a rotary shaker. 100 ml. of this culture are used to inoculate the 5 litres of nutrient solution. 24 hours after inoculation the fermentation temperature is reduced to 20° C. At or near the completion of the logarithmic growth phase, that is to say 24 to 36 hours after inoculation, 20 g. of n-hexadecyl bromide are added. Two further additions of 20 g. of n-hexadecyl bromide are made at 24 hour intervals. Fermentation is continued for 5 days after the first addition of n-hexadecyl bromide. The mixture of culture fluid and cells is extracted with 2000 ml. of ethyl acetate in two equal portions. The ethyl acetate extract is dried, and then the ethyl acetate is evaporated. 57.5 g. of the residual gum are dissolved in 10 ml. of hot ethyl acetate. 100 ml. of petroleum ether (B.P. 40–60° C.) are then added, and the whole is allowed to stand at ambient temperature for four hours. The upper layer (petroleum ether) is decanted and retained, and the gummy residue is again extracted with 100 parts of petroleum ether (B.P. 40–60° C.) as above, the gummy residue being retained. The petroleum ether fractions are combined and evaporated under reduced pressure. The residual oil is mixed with 100 parts of petroleum ether (B.P. 40–60° C.) and the mixture is allowed to stand at ambient temperature overnight. The petroleum ether layer is decanted and the small amount of gummy residue is combined with the abovementioned gummy residue. 36.5 g. of gummy residue are refluxed with 90 ml. of a 1% v./v. solution of sulphuric acid in methanol for 6 hours. After removing the methanol by evaporation under reduced pressure, 158 ml. of water are added to the residual mass, and the organic material is then extracted four times with 100 parts of ether each time. The combined ether extracts are then washed with 50 parts of water. The ether solution is washed three times with 20 ml. of 1 N-sodium hydroxide solution each time. The alkaline washings are extracted once with 20 ml. of ether, and the ether extract combined with the main ether layer. The combined ether extracts are washed three times with 40 ml. of water each time, dried over anhydrous magnesium sulphate and evaporated. There is thus obtained dimethyl 1,16-hexadecandioate, M.P. 48–49° C.

EXAMPLE 23

The procedure of Example 1 is repeated except that the nutrient solution contains 0.01 g. of $KH_2PO_4$ per litre of distilled water. In a similar manner there is obtained dimethyl 1,16-hexadecandioate, M.P. 50–57° C.

EXAMPLE 24

The procedure of Example 1 is repeated except that the strain No. NCYC 689 of Torulopsis is used in place of the strain No. NCYC 675 of Torulopsis. There is thus obtained dimethyl 1,16-hexadecandioate, M.P. 50–51° C.

EXAMPLE 25

The procedure of Example 1 is repeated except that the strain No. NCYC 690 of Torulopsis is used in place of the strain No. NCYC 675 of Torulopsis. There is thus obtained dimethyl 1,16-hexadecandioate, M.P. 50–51° C.

What we claim is:

1. A process for the manufacture of a compound of the formula:

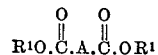

wherein $R^1$ is selected from the group consisting of hydrogen and alkyl and aryl of not more than 10 carbon atoms, and A is selected from the group consisting of a radical of the formula $-(CH)_x-$ wherein $x$ stands for an integer from 14 to 16, a radical of the formula $-(CH_2)_x-$ which is substituted with an alkyl radical of not more than 3 carbon atoms and wherein $x$ stands for an integer from 14 to 16, an unsaturated straight-chain aliphatic radical containing 14 to 16 carbon atoms, and an unsaturated straight-chain aliphatic radical containing 14 to 16 carbon atoms which is substituted with an alkyl radical of not more than 3 carbon atoms, the process comprising the fermentation of at least one compound of the formula $CH_3.B.R^2$, wherein $R^2$ stands for an ester group, and B is selected from the group consisting of a radical of the formula $-(CH_2)_y-$ wherein $y$ stands for an integer from 15 to 25, a radical of the formula $-(CH_2)_y-$ which is substituted with an alkyl radical of not more than 3 carbon atoms and wherein $y$ stands for an integer from 15 to 25, an unsaturated straight-chain aliphatic radical containing 15 to 25 carbon atoms, and an unsaturated straight-chain aliphatic radical containing 15 to 25 carbon atoms which is substituted with an alkyl radical of not more than 3 carbon atoms, in the presence of a strain of Torulopsis which ferments n-hexadecyl bromide in a conventional culture medium to give 1,16-hexadecandioic acid derivatives.

2. A process as claimed in claim 1 in which the strain is Torulopsis strain NCYC 675.

3. A process as claimed in claim 1 in which the strain is selected from the group consisting of Torulopsis strains NCYC 689 and 690.

4. A process as claimed in claim 1 in which the product of the fermentation is reacted with a compound of the formula $R^3.OH$, wherein $R^3$ is selected from the group consisting of alkyl and aryl of not more than 10 carbon atoms, under conditions selected from the group consisting of acidic and alkaline conditions, to give the corresponding di-ester.

5. A process as claimed in claim 1 in which the product of the fermentation is reacted with a compound of the formula $R^3.OH$, wherein $R^3$ is selected from the group consisting of alkyl and aryl of not more than 10 carbon atoms, under conditions selected from the group consisting of acidic and alkaline conditions, to give the corresponding di-ester, which di-ester is then converted into the corresponding dicarboxylic acid by hydrolysis.

6. A process as claimed in claim 1 in which the product of the fermentation is hydrolysed under conditions selected from the group consisting of acidic and alkaline conditions to give the corresponding dicarboxylic acid.

7. A process as claimed in claim 1 which comprises the fermentation of n-hexadecyl bromide.

8. A process as claimed in claim 4 for the manufacture of dimethyl 1,16-hexadecandioate.

References Cited

UNITED STATES PATENTS 3,205,150  9/1965  Spencer et al. _____ 195—30

LIONEL M. SHAPIRO, Primary Examiner